Nov. 24, 1936.  C. W. CLAUSON  2,061,651
VEHICLE SPRING
Filed Oct. 23, 1935
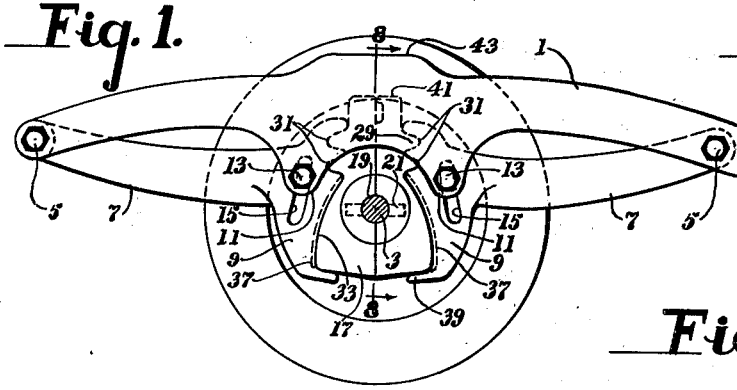
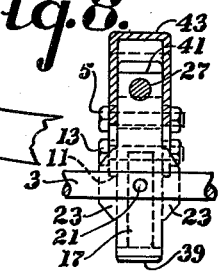
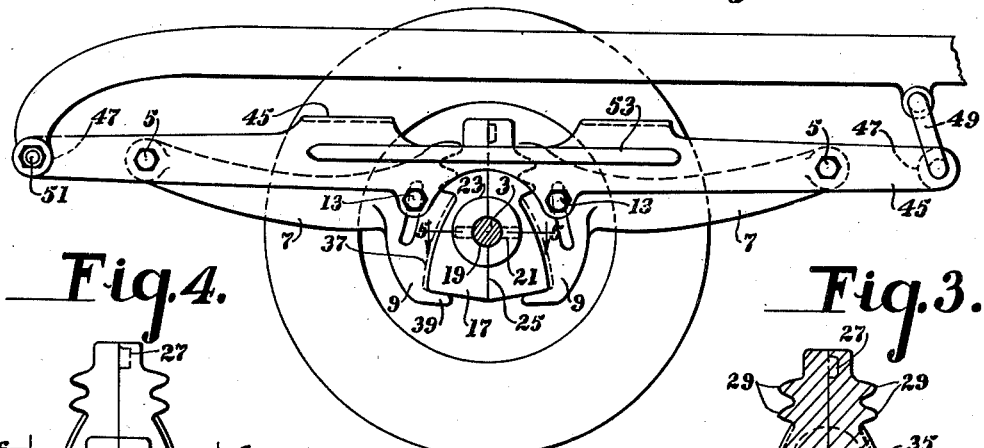
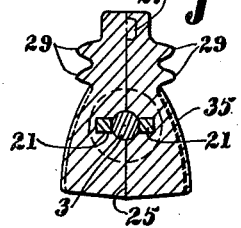
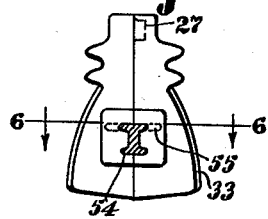
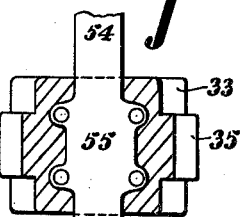
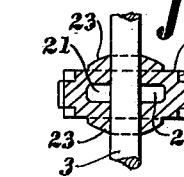
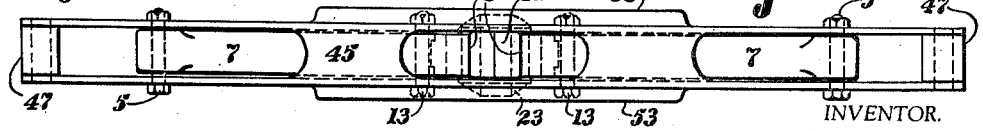
INVENTOR.
Clas William Clauson,
BY Robert K. Randall,
ATTORNEY.

Patented Nov. 24, 1936

2,061,651

UNITED STATES PATENT OFFICE 2,061,651

VEHICLE SPRING

Clas William Clauson, Brookline, Mass.

Application October 23, 1935, Serial No. 46,284

7 Claims. (Cl. 267—21)

This invention relates to vehicle springs, and in particular to springs for automobiles. One object of the invention is to provide for mounting the axles of an automobile in rubber, so that the shocks, jars, and vibrations imparted to the wheels and thereby to the axles through rapid passage over the inequalities of the road and which fail to be absorbed by the pneumatic tires, will be mitigated and largely or wholly absorbed before they are transmitted to the frame of the vehicle. A broader aim of the invention is to dispense entirely with springs comprising flexible metallic elements such as the customary leaf or coil springs, with their greater shock-transmitting nature and their proneness to fatigue and breakage without warning, and in their stead to employ the resilience of rubber, with its relative absence of periodic vibration, as well as its shock-absorbing capacity, to level out the inequalities of the road.

A further object of the invention is to provide a rubber axle-support and spring assembly which makes provision for proper transmission of torque from the axle to the axle-supporting elements and ultimately to the body of the vehicle in braking, and in applying the driving power to the rear axle.

Another object of the invention is to prevent the movement of the axle except in a vertical plane, so that the steering of the vehicle shall not be interfered with in the course of the rise and fall of the wheels with respect to the body in passing over inequalities of the road. An added object of the invention is to provide a spring assembly and axle mounting thus taking advantage of the desirable features of rubber, which can be simply and easily substituted in existing vehicles for the standard type of semi-elliptic metallic leaf springs. A still further object is to provide a spring devoid of extensive rebound, so that rebound checks or other clamping devices will not be needed.

To these and other ends, the invention comprises the novel features of construction and combination and arrangement of parts more fully described hereinafter and set forth in the appended claims.

An illustrative embodiment of the invention is shown in the accompanying drawing, in which, Fig. 1 is a view in elevation of an automobile wheel, axle, and a portion of the frame, with the improved spring applied thereto, viewed from midwidth of the vehicle.

Fig. 2 is a corresponding view of the same parts of a vehicle, showing the arrangement of the improved spring when made to replace the existing type of leaf spring.

Fig. 3 is a vertical section of the rubber block forming the resilient element of the spring assembly of Figs. 1 and 2.

Fig. 4 is a view of the rubber element alone, in place upon a front axle of standard I-beam section.

Fig. 5 is a horizontal section on line 5—5 of Fig. 2, showing the manner of pinning the rubber element to the axle.

Fig. 6 is a similar horizontal section on line 6—6 of Fig. 4, showing the manner of applying the rubber element to the spring-perch of the standard front axle of I-beam section.

Fig. 7 is a plan view of the replacement unit of Fig. 2.

Fig. 8 is a transverse vertical sectional view of the suspension taken on line 8—8, Fig. 1.

Referring to Fig. 1, which shows a portion of the front axle assembly of an automobile designed at the outset to employ the improved springs, the side frame member 1 of the chassis is made of inverted U-section, and has also an upwardly arched extent throughout the span of the spring reaching its highest point immediately over the axle 3. Shackle pins 5 put through the depending flanges of the U-section side frame member 1 at the desired points serve as pivots for the ends of two toggle arms 7 the free ends 9 of which fill the width of the channel in side frame member 1 and work up and down freely within the side flanges thereof, these flanges being extended downwardly on both sides of each toggle arm as well as before and behind the axle 3 as indicated at 11 to serve as guides maintaining the toggle arms in the vertical plane of the side frame member 1 and to afford considerable scope of movement of the free ends of the toggle arms up and down without escape from the guides 11. Bolts 13 each passing through holes in the opposed pair of guides 11 located respectively before and behind the axle 3 pass through arcuate slots in the free ends of the toggle arms 7, to limit the up and down stroke of these free ends and thus determine the vertical rise and fall permitted the axle 3.

Gripped and compressed between the opposing free ends of the toggle arms 7 is a relatively massive block of rubber 17. The resilience of this block is so chosen that the compressive forces exerted by the opposed portions 9 of the toggle arms thereagainst, under the particular spring's share of the normal weight of the vehicle at rest, will cause the pins 13 to stand a moderate distance from the top of the slots 15, so as to afford the axle 3 ample scope for movement upward toward the side frame member 1, and a moderate degree of rebound in the opposite direction before the pins 13 bring up at the top ends of the slots 15.

The axle 3 extends through a hole 19 passing transversely through the approximate center of the block 17 of rubber constituting the resilient element of the spring, being insulated from all metallic parts of the spring and of the frame of the vehicle by the surrounding mass of rubber. To prevent relative rotation or endwise movement of the axle 3 with respect to the rubber block 17, in the case of a front axle of round section as in Figs. 1, 2, 3, and 5, and in the case of the rear axle housing, protuberances or pins 21 are formed on the axle or applied thereto as by brazing or welding, to be received within appropriate pockets formed in the block 17 at right angles to the hole 19, and midway of the thickness thereof, as shown in Fig. 5. The material of the resilient block 17 is extended along the axle to form bosses 23 giving an increased hold on the axle. To facilitate the application of the rubber block to the axle where such pins are used, the block may be formed in two separate halves meeting along the line 25, with a boss 27 on one half fitting into an appropriate depression in the other half near the top of the element to maintain the two parts in alignment at the top.

Preferably the two toggle arms 7 together with their extremities 9 are made of pressed metal, instead of solid sections, to reduce the unsprung weight of the axle and spring assembly.

Since the rubber element 17 must support roughly one-quarter of the weight of the vehicle and its load, in addition to its other two functions of affording resilience to the spring and of absorbing the shocks and jars to which the axle is subjected, its upper portion is provided at front and rear with a plurality of integral and substantially rounded flanges or ribs 29 extending transversely across its front and back surfaces, which are received in correspondingly shaped recesses 31 in the opposing faces of the free ends 9 of the toggle arms. These intermeshing irregularities, together with the downwardly flaring front and back surfaces 33 of the lower half of the rubber element 17, prevent the upward escape of the block 17 from the opposed ends 9 of the toggle arms. The tendency of the toggle to straighten under the load of the vehicle is resisted with progressively increasing force as the spring is flattened, by the widened portion of the block 17 located below the axle. This resistance mounts rapidly because of the progressive downward shift of the center of pressure of the jaws 9 against the block 17 or of the theoretical pivot about which the toggle arms swing with respect to each other, resulting from the peculiar angular relationship of these faces of the toggle arms which engage the surfaces 33 of the rubber element 17.

Because these faces of the jaws 9 are prolonged transversely of the toggle arms in the vertical plane of the latter's movement, with the rubber block 17 characteristically extended in a vertical direction, this center of pressure shifts rapidly from below the axle to above the latter as the spring rebounds, thus exerting a sharply mounting force opposing the bending of the toggle when the latter exceeds the angularity of its normal unloaded position of equilibrium. Thus on a rebound the upper portions of the jaws 9 adjacent the recesses 31 compress the portion of the rubber block above the axle to check the downward travel of the axle away from the body of the vehicle, making auxiliary rebound checks, snubbers, or other spring-clamping devices unnecessary.

To prevent lateral escape of the lower portion of the rubber element 17 from the ends 9 of the toggle, the block is formed with ribs 35 down the front and back surfaces of its lower portion, which are received in corresponding recesses 37 formed in the opposing lower faces of the jaws 9 of the toggle levers. These jaws are also carried around under the block as indicated at 39 to prevent downward escape, as also to add a certain amount of compressing force on the rubber block to resist flattening of the spring.

The top portion of the resilient element 17 is continued upwardly beyond the jaws of the toggle as indicated at 41, to constitute a bumper striking against the top 43 of the arched portion of the side frame member 1 when a severe bump is encountered or the spring is otherwise overloaded.

Fig. 2 shows the application of the invention to form a spring designed for replacement of the existing types of semi-elliptical leaf springs. In this adaptation, the parts are as before described, except that an added element 45 is used to take the place of the specially formed inverted U-section side frame member 1, this member 45 being likewise of inverted U-section but with extensive portions of the top of the inverted U cut away for lightness, as illustrated in Figs. 2 and 7. The ends of the otherwise separated parallel extremities of the member 45 are joined by sleeves 47 permanently fixed in place therein, through which sleeves and matching holes in the extremities of member 45 are put the shackle 49 and shackle pin 51 respectively used to hold the corresponding ends of the old leaf spring. To provide lateral stiffness, a rib 53 is struck up on each side of the member 45 throughout the central portion where the strains on this member are the greatest. The shackle pins 5 described in connection with Fig. 1 are applied to the side flanges of member 45 just as to the side frame member 1, to form the pivots on which the toggle arms 7 swing.

Figs. 4 and 6 show the manner of applying the rubber element 17 to the axle when the familiar I-beam section front axle is to be used. In that case, the rubber block is widened and thickened and cast in two portions with appropriate apertures to fit closely about the section of the axle 54 and to include the widened portion 55 with its lugs to which the old leaf spring was clipped, this spring-perch 55 thus serving the functions of the applied pins 21 in the case of the round front axle 3 or the rear axle housing in preventing lateral displacement of the axle, and cooperating with the non-circular section of the axle to prevent relative rotation under the strain of braking.

The prolongation in a generally vertical direction of the opposed faces of the jaws of the toggle arms which engage the resilient element 17 prevents twisting the rubber element 17 out of the toggle arms as a result of the torque applied to the axle in braking or in driving the rear wheels. The bolts 13 perform a function in limiting the downward travel of one or other of the toggle arms, also, when this torque becomes severe.

Application of the improved spring to the rear axle of an automobile is made in a manner exactly analogous to that shown and described with regard to the front axle, appropriate provision being made for giving the rear axle the necessary increased scope of up-and-down movement, and customary forms of torque-arms being used to aid in holding the rear axle housing from rotation in heavy-duty work if required.

Change of the stiffness and of the character and yieldability of the spring to suit different conditions of use can be easily made by replacing the rubber element with a similar block of rubber having different characteristics of resilience and yieldability. Replacement is easily effected by lifting the frame of the vehicle until the wheel adjacent the spring in question is well off the ground, and thereupon withdrawing the bolts 13 to drop the axle and open the jaws 9 of the toggle arms wide apart, whereupon a new rubber may be quickly inserted and put into working relation merely by lowering the vehicle to let its weight again rest upon the wheel.

While I have illustrated and described certain forms in which the invention may be embodied, I am aware that many modifications may be made therein by any person skilled in the art, without departing from the scope of the invention as expressed in the claims. Therefore, I do not wish to be limited to the particular forms shown, or to the details of construction thereof, but What I do claim is:—

1. A vehicle spring suspension comprising in combination an axle, a wheel concentric with the axis thereof, toggle arms having their opposed ends spaced apart, a rubber element interposed between the opposed ends of such arms, and means holding the axle within the rubber element.

2. A vehicle spring comprising in combination opposed toggle arms pivoted in fixed spaced relation, a rubber block interposed between and separating the opposed extremities of the arms, and means holding the vehicle axle within the rubber block.

3. A vehicle spring comprising in combination opposed toggle arms pivoted in fixed spaced relation, a resilient element interposed between the free extremities of the arms to be compressed thereby as the toggle straightens, and means for holding the vehicle axle within the center of the resilient element whereby the axle is confined to appreciable movement in a single plane only.

4. In a vehicle, in combination, a frame, a wheel, an axle, and a spring comprising two opposed toggle arms, pivots located in fixed position at spaced intervals lengthwise of the frame, on which pivots the toggle arms are respectively hinged, with the spacing of the pivots exceeding the total length of the two toggle arms, a resilient element interposed between the opposed ends of the toggle arms and resisting approach of these ends toward each other incident to straightening of the toggle, and means maintaining the axle always between and equidistant from the opposed ends of the toggle arms.

5. In a vehicle, in combination, a frame, an axle, two rigid arms each pivoted to the frame attaching the axle to the frame, a non-circular enlargement on the axle, and a rubber mounting through which the axle extends interposed between the latter and the free ends of the arms and conforming to the non-circular enlargement, whereby relative rotation between the axle and the rubber is prevented.

6. A vehicle spring comprising in combination opposed toggle arms, and a rubber block separating the proximate ends of such arms, the arms having faces engaging the block which are extended transversely of the arms in the plane of the latter's movement so as to apply increasing compressive pressure to the block both as the toggle is straightened and as it is bent.

7. A vehicle spring comprising in combination opposed toggle arms, a rubber element intervening between the opposed ends of the toggle arms and constituting the sole connection between such ends, with these ends provided with vertically extended faces engaging the rubber element and exerting a compressive force thereon which increases as the toggle is bent and as it is straightened, and means connecting the vehicle axle with the rubber element.

CLAS WILLIAM CLAUSON.